United States Patent
Lewis et al.

(10) Patent No.: US 9,597,732 B2
(45) Date of Patent: Mar. 21, 2017

(54) FLOW RESTRICTOR ASSEMBLIES INCLUDING A MONOLITHIC FLOW RESTRICTOR AND METHODS FOR MANUFACTURING THE SAME

(71) Applicant: HONEYWELL INTERNATIONAL INC., Morristown, NJ (US)

(72) Inventors: Steven Alan Lewis, South Bend, IN (US); Michael J Spier, Three Rivers, MI (US); James Williams, New Carlisle, IN (US); Gary A Valencourt, Niles, MI (US); Anthony M. Gibbs, Mishawaka, IN (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 13 days.

(21) Appl. No.: 14/604,888

(22) Filed: Jan. 26, 2015

(65) Prior Publication Data
US 2016/0215914 A1    Jul. 28, 2016

(51) Int. Cl.
| | |
|---|---|
| *F16L 55/027* | (2006.01) |
| *B22F 5/10* | (2006.01) |
| *B22F 3/105* | (2006.01) |
| *B33Y 10/00* | (2015.01) |
| *B33Y 80/00* | (2015.01) |

(52) U.S. Cl.
CPC .............. *B22F 5/10* (2013.01); *B22F 3/1055* (2013.01); *B33Y 10/00* (2014.12); *B33Y 80/00* (2014.12); *F16L 55/02736* (2013.01); *F16L 55/02781* (2013.01); *B22F 2998/10* (2013.01)

(58) Field of Classification Search
CPC .............................. F16L 55/02736; F16T 1/34
USPC ....................................................... 138/40–42
See application file for complete search history.

(56) References Cited

U.S. PATENT DOCUMENTS

| | | | | |
|---|---|---|---|---|
| 2,194,946 A | * | 3/1940 | Kunstorff | ............... F16T 1/34 137/177 |
| 3,323,550 A | * | 6/1967 | Lee, II | ............... F15C 1/02 137/809 |
| 3,586,104 A | * | 6/1971 | Hyde | ............... E21B 49/08 138/42 |
| 4,234,008 A | * | 11/1980 | Cronfel | ............... F16T 1/34 137/182 |
| 4,466,462 A | * | 8/1984 | Morris | ............... F16L 55/02736 138/40 |

(Continued)

FOREIGN PATENT DOCUMENTS

| | | | | |
|---|---|---|---|---|
| GB | 2043951 A | * | 10/1980 | ............ F16F 9/3285 |
| WO | 2010040354 A1 | | 4/2010 | |

*Primary Examiner* — Patrick F Brinson
(74) *Attorney, Agent, or Firm* — Lorenz & Kopf, LLP (57) ABSTRACT

Flow restrictor assemblies including a monolithic flow restrictor and methods for manufacturing the same are provided. The monolithic flow restrictor is configured for disposing in a fluid passage of a housing body. The monolithic flow restrictor comprises a first end and a second end, a first screen at the first end and a second screen at the second end, and a series of cross-sectional portions between the first screen and the second screen. Each cross-sectional portion has a plurality of slots formed in a radially outer surface thereof for connecting a series of restricting orifices formed in the monolithic flow restrictor for tortuously conducting a fluid through the series of cross-sectional portions.

11 Claims, 11 Drawing Sheets

(56) References Cited

U.S. PATENT DOCUMENTS

| | | | | |
|---|---|---|---|---|
| 4,715,395 A | * | 12/1987 | Mainelli | F02C 9/263 138/42 |
| 5,156,680 A | * | 10/1992 | Orzechowski | F16L 55/02736 118/313 |
| 5,673,751 A | * | 10/1997 | Head | E21B 21/08 137/599.01 |
| 5,819,803 A | * | 10/1998 | Lebo | F16K 47/08 137/625.3 |
| 7,521,012 B2 | | 4/2009 | Stankowski et al. | |
| 7,866,345 B2 | * | 1/2011 | Lowery | G01F 1/40 138/37 |
| 8,826,938 B2 | | 9/2014 | Moore | |
| 2005/0016604 A1 | | 1/2005 | Steinke et al. | |

* cited by examiner

FLOW RESTRICTOR ASSEMBLIES INCLUDING A MONOLITHIC FLOW RESTRICTOR AND METHODS FOR MANUFACTURING THE SAME

TECHNICAL FIELD

The present invention generally relates to gas turbine engines, and more particularly relates to flow restrictor assemblies including a monolithic flow restrictor and methods for manufacturing the same.

BACKGROUND

Hydraulic systems such as fuel control systems use flow restrictors to control and/or balance the pressure drop and mass flow rate of a fluid flow through a fluid channel. Unfortunately, even after hydraulic systems are cleaned and filtered, there may be metal or dirt particulate in the hydraulic system that can clog an orifice of the flow restrictor, causing the hydraulic system to fail. Single-stage flow restrictors include a single orifice. Conventional multi-stage flow restrictors include a series of stacked discrete plates with multiple larger orifices. With a multi-stage flow restrictor, the fluid and particulate are channeled through the multiple larger orifices instead of through just one orifice, reducing fluid exit velocity, pressure, and heat as well as being more tolerant of particulate. Therefore, multi-stage flow restrictors enable larger orifices with the same resistance to flow as single-stage flow restrictors, while incurring less wear, lasting longer, and tolerating more particulate before flow is affected, resulting in more consistent and reliable flow restriction than provided by single-stage flow restrictors.

However, a conventional multi-stage flow restrictor requires precise machining in order to effect the desired flow restriction, making it expensive and difficult to manufacture. As a result, a conventional multi-stage flow restrictor represents a significant cost in the hydraulic system in which it is used. Costs are further compounded in the typical hydraulic system where a plurality of flow restrictors may be necessary. Furthermore, maintaining different sizes of conventional multi-stage flow restrictors on hand is necessary for compatibility with different fittings therefor, further increasing costs.

Hence, there is a need for flow restrictor assemblies with an improved multi-stage flow restrictor and methods for manufacturing the same. The flow restrictor assemblies and improved multi-stage flow restrictors are significantly more economical to manufacture than conventional flow restrictor assemblies and multi-stage flow restrictors and the multi-stage flow restrictors are customizable for different flow restriction thereby eliminating the need to keep different sizes on hand.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

Monolithic flow restrictors are provided. In accordance with one exemplary embodiment of the present invention, the monolithic flow restrictor is configured for disposing in a fluid passage of a housing body. The monolithic flow restrictor comprises a first end and a second end, a first screen at the first end and a second screen at the second end, and a series of cross-sectional portions between the first screen and the second screen. Each cross-sectional portion has a plurality of slots formed in a radially outer surface thereof for connecting a series of restricting orifices formed in the monolithic flow restrictor for tortuously conducting a fluid through the series of cross-sectional portions.

Flow restrictor assemblies are provided in accordance with yet another exemplary embodiment of the present invention. The flow restrictor assembly is configured for disposal in a flow channel of a hydraulic assembly. The flow restrictor assembly comprises a housing body and a monolithic flow restrictor. The housing body has a first bore and a second bore and a fluid passage communicating the first and second bores. The second bore is configured to receive an expansion pin for substantially locking the flow restrictor assembly in the flow channel. The monolithic flow restrictor is disposed in the fluid passage. The monolithic flow restrictor comprises a first end and a second end, a first screen at the first end and a second screen at the second end, and a series of cross-sectional portions defining a flow restrictor body between the first screen and the second screen. Each of the cross-sectional portions has a plurality of slots formed in a radially outer surface thereof for connecting a series of restricting orifices formed in the monolithic flow restrictor for tortuously conducting a fluid through the flow restrictor body. The housing body has a close tolerance with an outer diameter of the flow restrictor body to substantially seal the plurality of slots.

Methods are provided for manufacturing a flow restrictor assembly in accordance with yet another exemplary embodiment of the present invention. The method comprises forming a monolithic flow restrictor and disposing the monolithic flow restrictor in a housing body. The monolithic flow restrictor comprises a first end and a second end, a first screen at the first end and a second screen at the second end, and a series of cross-sectional portions between the first screen and the second screen forming a flow restrictor body. Each of the cross-sectional portions has a plurality of slots formed in a radially outer surface thereof for connecting a series of restricting orifices formed in the monolithic flow restrictor for tortuously conducting a fluid through the series of cross-sectional portions. Forming the monolithic flow restrictor comprises using additive manufacturing to form an intermediate monolithic flow restrictor from a powder metal material, removing unfused powder metal from the intermediate monolithic flow restrictor, and machining the intermediate monolithic flow restrictor after the removing step.

Furthermore, other desirable features and characteristics of the flow restrictor assemblies including a monolithic flow restrictor and methods for manufacturing the same will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Various embodiments are directed to flow restrictor assemblies including a monolithic flow restrictor and methods for manufacturing the same. The flow restrictor assembly may be used in a flow channel of a hydraulic assembly of a hydraulic system, such as a fuel system of a gas turbine engine. Exemplary hydraulic assemblies include actuators, metering valves, fuel valves, air valves, oil valves, and hydraulic valves, pumps, brake systems, steering systems, transmissions, etc. The monolithic flow restrictor may be a gas flow restrictor or a liquid flow restrictor. As used herein, the term "monolithic" refers to a one-piece, seamless unitary structure. As hereinafter described, the monolithic flow restrictor comprises a multi-stage flow restrictor. The flow restrictor assembly and the monolithic flow restrictor included therein are more economical to manufacture than conventional flow restrictor assemblies including a conventional multi-stage flow restrictor.

Figure 1:
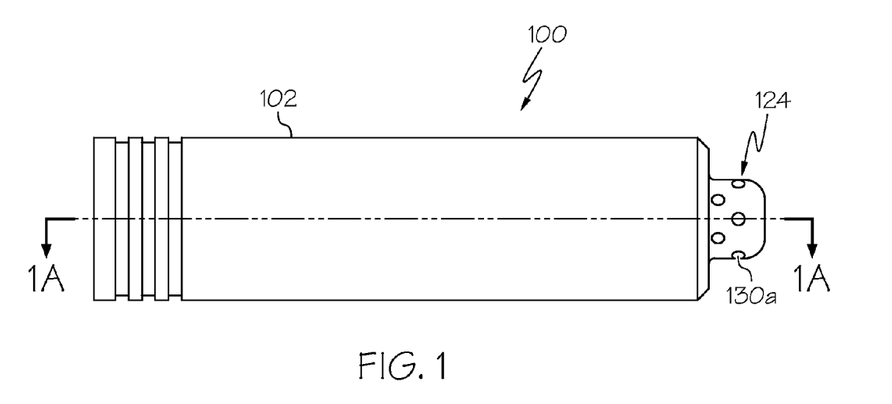
FIG. 1 is an external view of a flow restrictor assembly according to exemplary embodiments of the present invention.
Figure 1A:
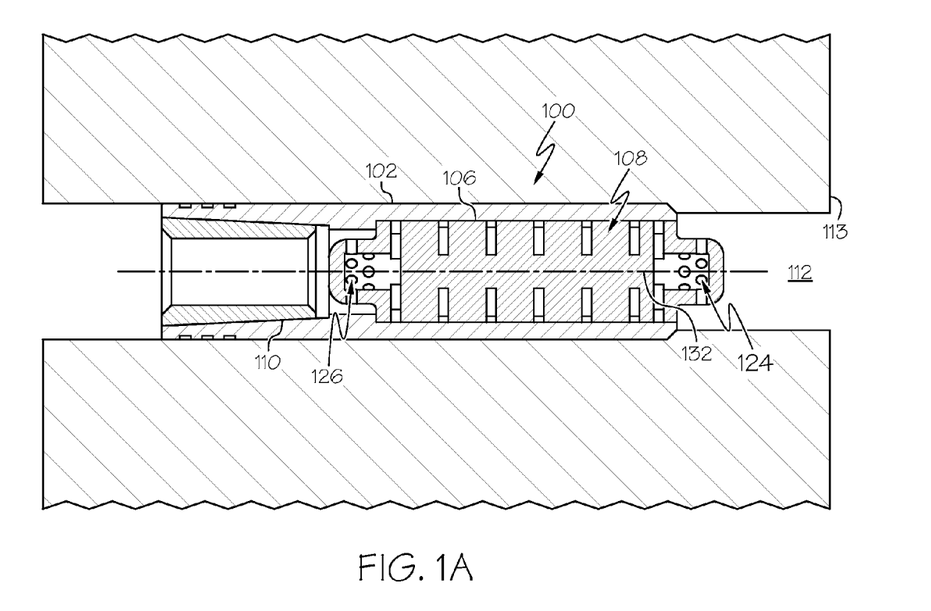
FIG. 1A is a sectional view of the flow restrictor assembly taken along the line 1A-1A of FIG. 1, the flow restrictor assembly depicted as disposed in a flow channel of a hydraulic assembly (shown schematically)
Figure 2:
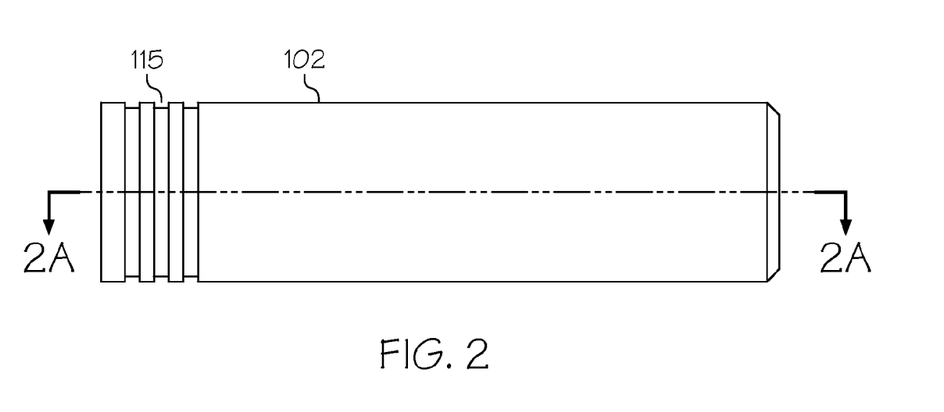
FIG. 2 is an external view of a housing body of the flow restrictor assembly of FIGS. 1 and 1A.
Figure 4:
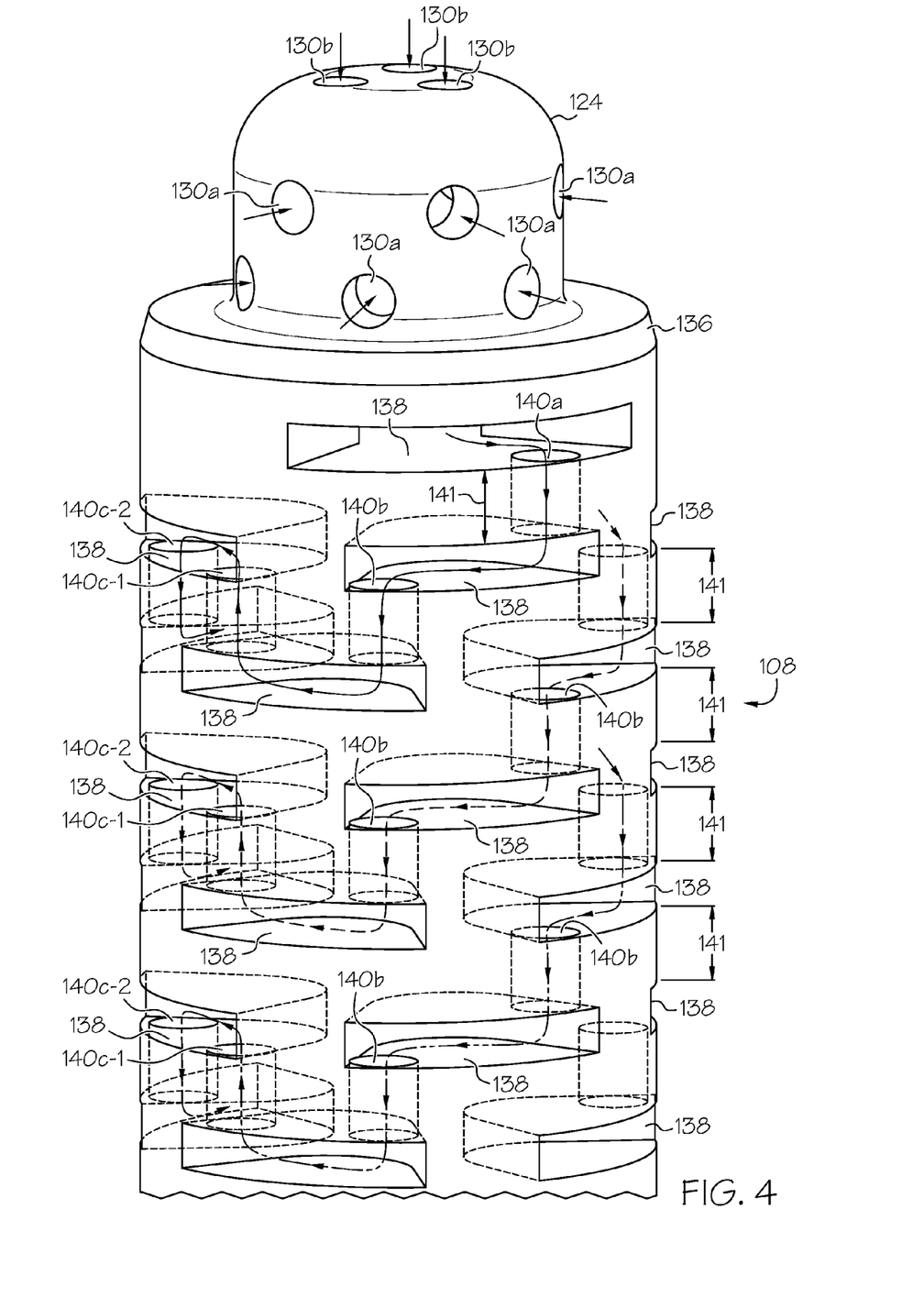
FIG. 4 is a perspective view of an upper portion of the monolithic flow restrictor of FIGS. 3, 3A, and 3B partially depicting the flow path therethrough (the flow around the rear of the monolithic flow restrictor not shown)
Figure 5:
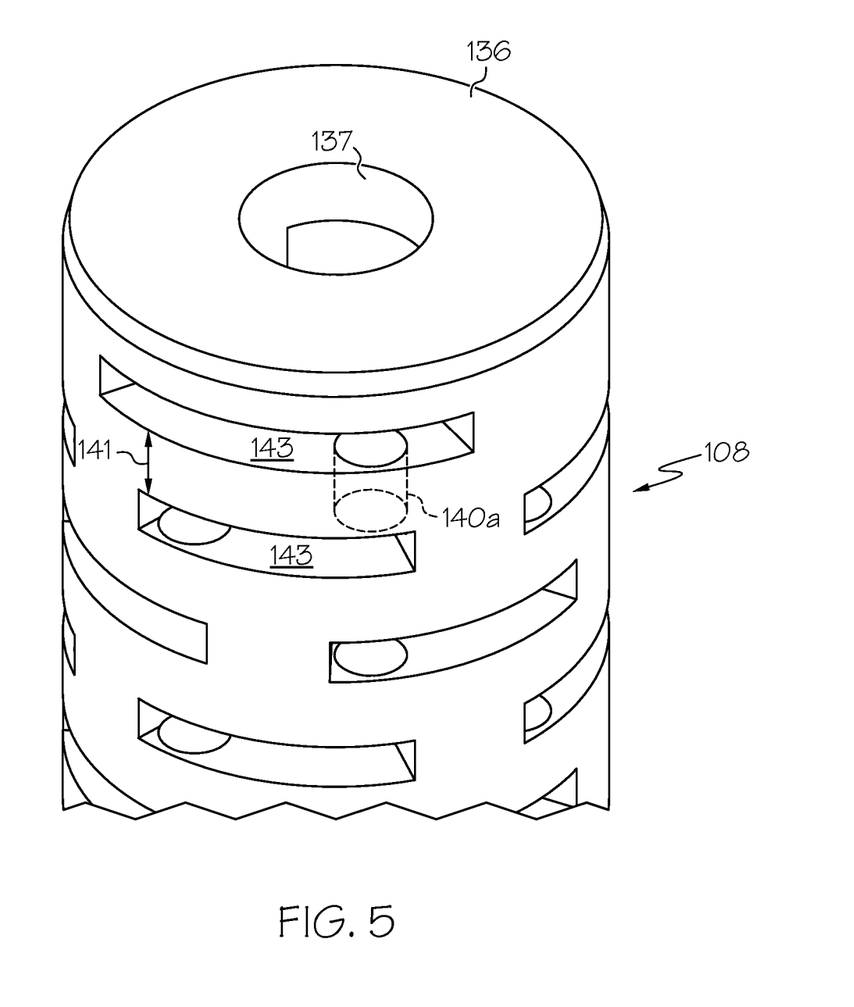
FIG. 5 is a view of a platform over a top of the flow restrictor body (partially shown) of the monolithic flow restrictor of FIGS. 3, 3A, and 3B.
Figure 6:
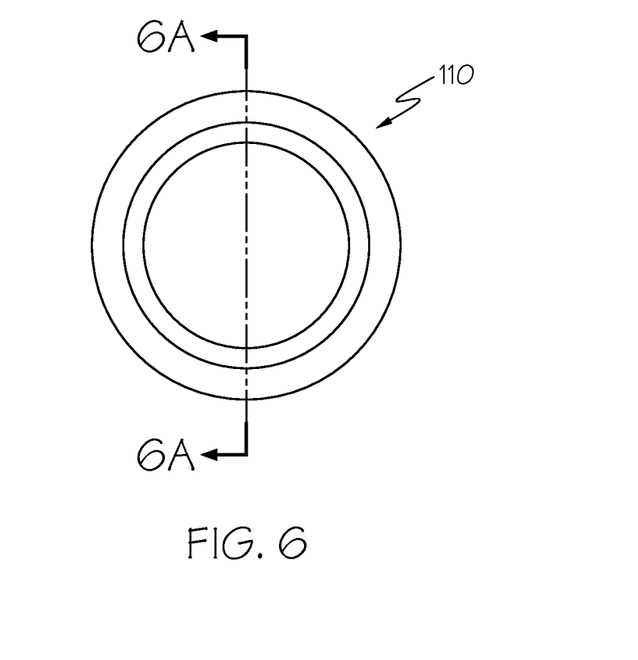
FIG. 6 is an end view of an expansion pin configured to lock the flow restrictor assembly in the flow channel of the hydraulic assembly as shown in FIG. 1A.
Figure 6A:
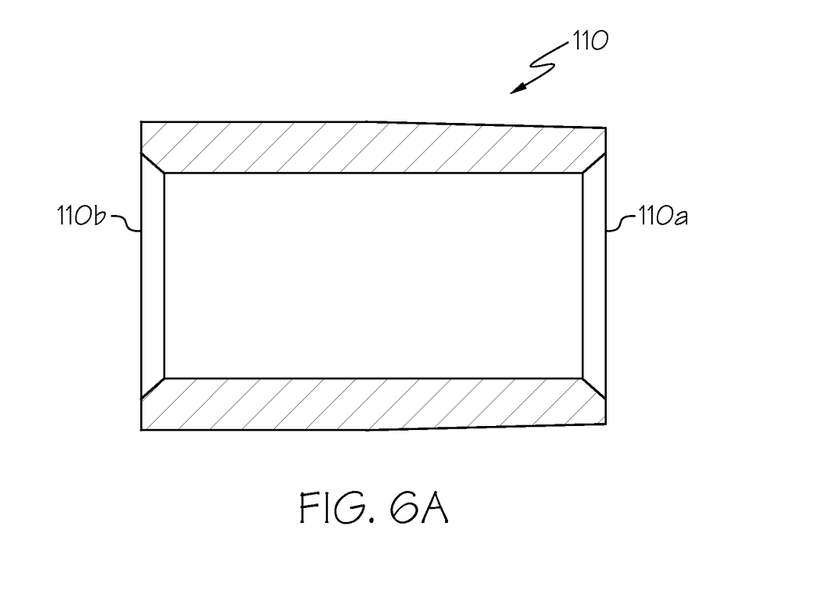
FIG. 6A is a cross-sectional view of the expansion pin of FIG. 6 taken along the line 6A-6A thereof.

Referring now to FIGS. 1 and 1A, an exemplary flow restrictor assembly 100 according to exemplary embodiments of the present invention is depicted. The flow restrictor assembly 100 generally comprises a housing body 102 having a first bore 103 and a second bore 104 and a fluid passage 106 (FIGS. 2 and 2A) communicating the first bore 103 and the second bore 104 and a monolithic flow restrictor 108 (see also, FIGS. 3 through 5) disposed in the fluid passage 106. The second bore 104 is configured to receive an expansion pin 110 (see also, FIGS. 6 and 6A) for locking the flow restrictor assembly 100 in a flow channel 112 of a hydraulic assembly 113 (partially shown schematically) as hereinafter described. The monolithic flow restrictor 108 disposed in the fluid passage of the housing body (an exemplary fitting) (without the expansion pin) is referred to herein as a "flow restrictor/fitting combination." Flow restrictor/fitting combinations other than those depicted may be used for flow and pressure control. For example, the monolithic flow restrictor 108 may be used in standard fittings, such as a sleeve as depicted, or a tube union, male adapter, hex nipple, or the like.

The housing body 102 (FIGS. 2 and 2A) of the flow restrictor assembly 100 (FIGS. 1 and 1A) is depicted as generally cylindrical and includes an outer diameter and an inner diameter. The outer diameter includes locking grooves 115 for purposes as hereinafter described. The housing body may be conventionally machined from a metallic material, such as 300 or 400 series steel (e.g., steel 302, 304, or 410) or Inconel® metal alloys (e.g., Inconel® 718). The housing body inner diameter has a close tolerance with an outer diameter of a flow restrictor body 114 as hereinafter described. The first and second bores 103 and 104 of the housing body 102 may both be generally cylindrical or the first bore 103 may be generally cylindrical and the second bore 104 tapered for purposes as hereinafter described.

Referring again to FIGS. 3 through 5, in accordance with exemplary embodiments of the present invention, the monolithic flow restrictor 108 comprises a first end 120 and a second end 122, a first screen 124 at the first end 120 and a second screen 126 at the second end 122, and a series of cross-sectional portions (e.g., 128-1, 128-2, and at least one set 129 of 128-3 and 128-4) (FIG. 3A and FIGS. 3E through 3H) between the first screen 124 and the second screen 126. Each of the first and second screens 124 and 126 includes n orifices 130a distributed in parallel along a line extending perpendicularly from a central axis 132 of the monolithic flow restrictor 108. Each of the first and second screens also includes a plurality of orifices 130b in a top 132 of the first end 120 and a top 134 of the second end 122 of the monolithic flow restrictor 108. While n number of orifices 130a and 130b are depicted, it is to be understood that a fewer or greater number of orifices 130a and/or 130b may be included in the first and second screens according to exemplary embodiments of the present invention. While dome-shaped first and second screens are depicted, it is to be understood that the first and second screens may be other than dome-shaped as known in the art. The first screen may have the same or a different shape than the second screen. There may be multiple screen layers to provide additional strength and integrity for applications where higher pressures could cause a single layer screen to rupture due to the effects of clogging. The integral screens of the monolithic flow restrictor 108 substantially block rogue contamination. A platform 136 (FIGS. 3 and 5) separates the first screen 124 and the cross-sectional portion 128-1. The platform 136 includes a central orifice 137 fluid communicating the interior of the first screen and the flow restrictor body.

The series of cross-sectional portions 128-1, 128-2, 128-3, and 128-4 comprise a plurality of concentric, generally parallel cross-sectional portions around the central axis 132. Each cross-sectional portion comprises a "stage" such that the monolithic flow restrictor 108 comprises a multi-stage flow restrictor in contrast to a single stage flow restrictor. As noted previously, in a "multi-stage flow restrictor", the fluid and particulate are channeled through multiple larger orifices instead of through just one orifice, reducing fluid exit velocity, pressure, and heat as well as being more tolerant of particulate. The series of cross-sectional portions 128-1 through 128-4 define the flow restrictor body 114 of the monolithic flow restrictor 108. The series of cross-sectional portions comprise a first cross-sectional portion 128-1 (FIG. 3E) adjacent the first screen 124, a second cross-sectional portion 128-2 (FIG. 3H) adjacent the second screen 126, and a central cross-sectional portion (comprising a stack of at least one set 129) between the first and second cross-sectional portions 128-1 and 128-2. The central cross-sectional portion comprises the stack of the at least one set 129 of alternating spin and impingement cross-sectional portions 128-3 and 128-4. While five sets 129 of alternating spin and impingement cross-sectional portions 128-3 and 128-4 are depicted in FIG. 3A, it is to be understood that a fewer or greater number of sets 129 may be included in the monolithic flow restrictor 108 according to exemplary embodiments of the present invention.

Each of the cross-sectional portions has the plurality of open-sided slots 138 (hereinafter referred to simply as "slots") formed in a radially outer surface of the flow restrictor body 114 for connecting a series of restricting orifices 140a, 140b, and 140c-1 and 140c-2 formed in the monolithic flow restrictor 108 for tortuously conducting the fluid through the flow restrictor body 114 (more particularly, through the series of cross-sectional portions). As depicted in FIG. 3B, opposite sides of each cross sectional portion include the open-sided slots 138 to define edge-wise slots in each of the cross-sectional portions. The series of restricting orifices 140a, 140b, and 140c-1 and 140c-2 are connected by the plurality of slots 138 to define a tortuous fluid flow path (indicated by arrows in FIG. 4 through the flow restrictor body 114) of the monolithic flow restrictor 108. The flow around the rear of the monolithic flow restrictor 109 is not shown. FIG. 4 also depicts multiple flow paths (indicated by arrows) into the orifices 130a and 130b of the first screen 124.

An initial restricting orifice 140a (FIGS. 3E, 4, and 5) in the series of restricting orifices extends through a land 141 between a top 143 of the first cross-sectional portion 128-1 and one of the slots 138 in the first cross-sectional portion 128-1. Each subsequent restricting orifice 140b and 140c-1 and 140c-2 in the series of restricting orifices extends through the land 141 between the slot 138 in a cross-sectional portion and the corresponding slot 138 of the plurality of slots 138 in an immediately successive cross-sectional portion. The term "land" 141 refers to a solid surface of continuous material that exists between a pair of slots (the slot and the corresponding slot) in successive cross-sectional portions (and also between the top of the first cross-sectional portion and one of the slots in the first cross-sectional portion as noted previously). The plurality of slots 138 in the spin cross-sectional portion 128-3 of the at least one set 129 are staggered in relation to the plurality of slots 138 in an immediately preceding (if present) and an immediately succeeding impingement cross-sectional portion 128-4.

A single restricting orifice 140b of the series of restricting orifices extends through one of the lands 141 of each cross-sectional portion between one of the plurality of slots therein and the corresponding slot in the immediately successive cross-sectional portion. Each of the single restricting orifices is staggered in relation to the single restricting orifice in the immediately succeeding cross-sectional portion so that the fluid being conducted through the flow restrictor body 114 (i.e., through the series of cross-sectional portions) will be caused to impinge on a top surface of the land of the immediately succeeding cross sectional portion while being tortuously conducted through the staggered single restricting orifices 140b.

The series of restricting orifices further comprises a plurality of orifice pairs 139. Each orifice pair 139 comprises a pair of the restricting orifices 140c-1 and 140c-2 that extend through each of the remaining lands (i.e., other than the land through which the single restricting orifice 140b extends between the slot in the spin cross-sectional portion and the corresponding slot in the impingement cross-sectional portion) of the spin cross-sectional portion between the respective slot therein and the corresponding slot in the successive impingement cross-sectional portion. Thus, an odd number of restricting orifices (the single restricting orifice 140b and the plurality of orifice pairs 139) extend through the lands between the slots in the spin cross-sectional portion to the corresponding slots in the immediately successive impingement cross-sectional portion. Each pair of restricting orifices comprises restricting orifice 140c-1 that conducts fluid in one direction and restricting orifice 140c-2 that conducts fluid in an opposite direction as hereinafter described.

Referring again to FIGS. 6 and 6A, as known in the art and noted previously, the expansion pin 110 is received in the second bore of the housing body 102 for substantially locking the flow restrictor assembly 100 in the flow channel 112 of the hydraulic assembly 113 (FIG. 1A). The expansion pin 110 is used to locally expand an outer diameter of the housing body 102 to effect a seal and retain the flow restrictor assembly in the flow channel. The expansion pin 110 has a pin first end 110a and a pin second end 110b. The expansion pin may be generally cylindrical or tapered. If tapered, the pin first end is narrow and configured to be inserted into the corresponding tapered second bore (such as depicted in FIG. 1A) of the housing body. The second bore is closely toleranced to the expansion pin 110. The expansion pin 110 (more particularly, the pin first end) is pressed into the second bore of the housing body causing the wall of the housing body to expand and create an interference fit with the flow channel of the hydraulic assembly into which the flow restrictor assembly is configured to be disposed.

Figure 3:
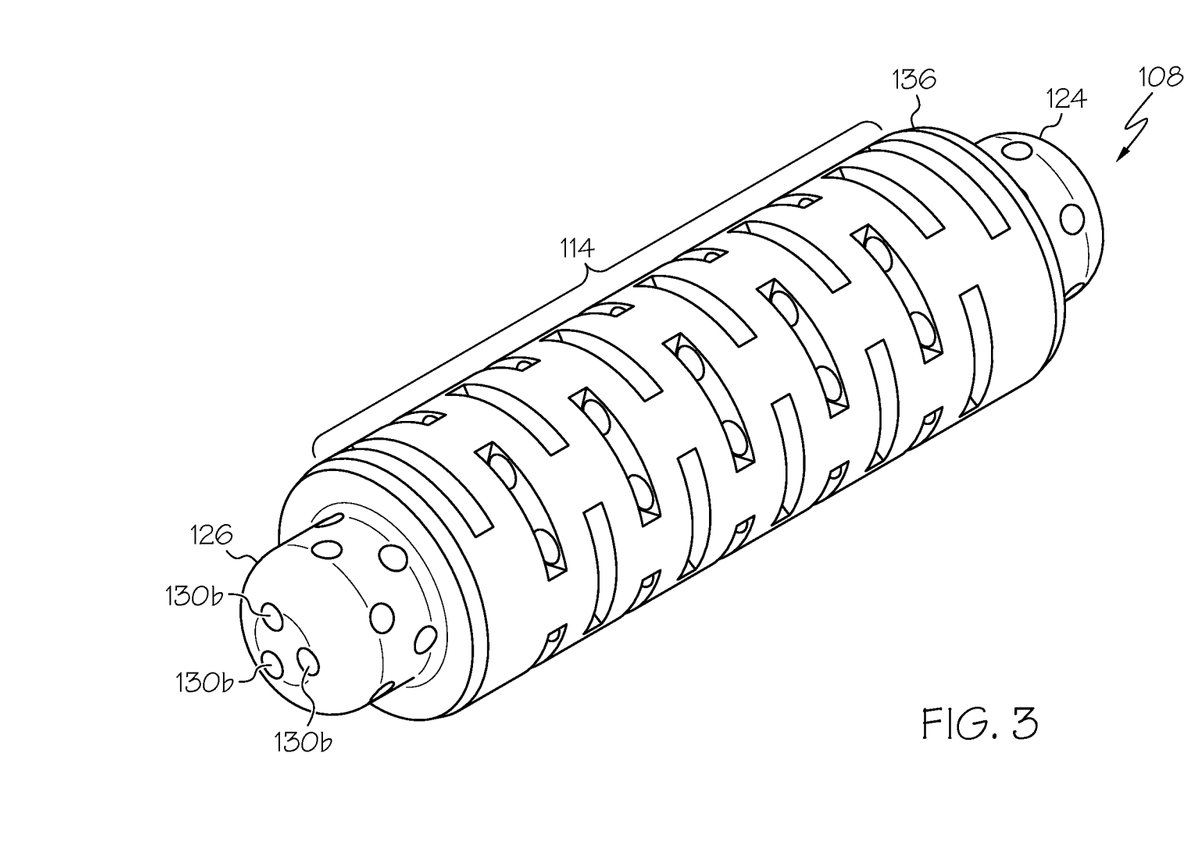
FIG. 3 is an isometric view of a monolithic flow restrictor of the flow restrictor assembly of FIGS. 1 and 1A.
Figure 3A:
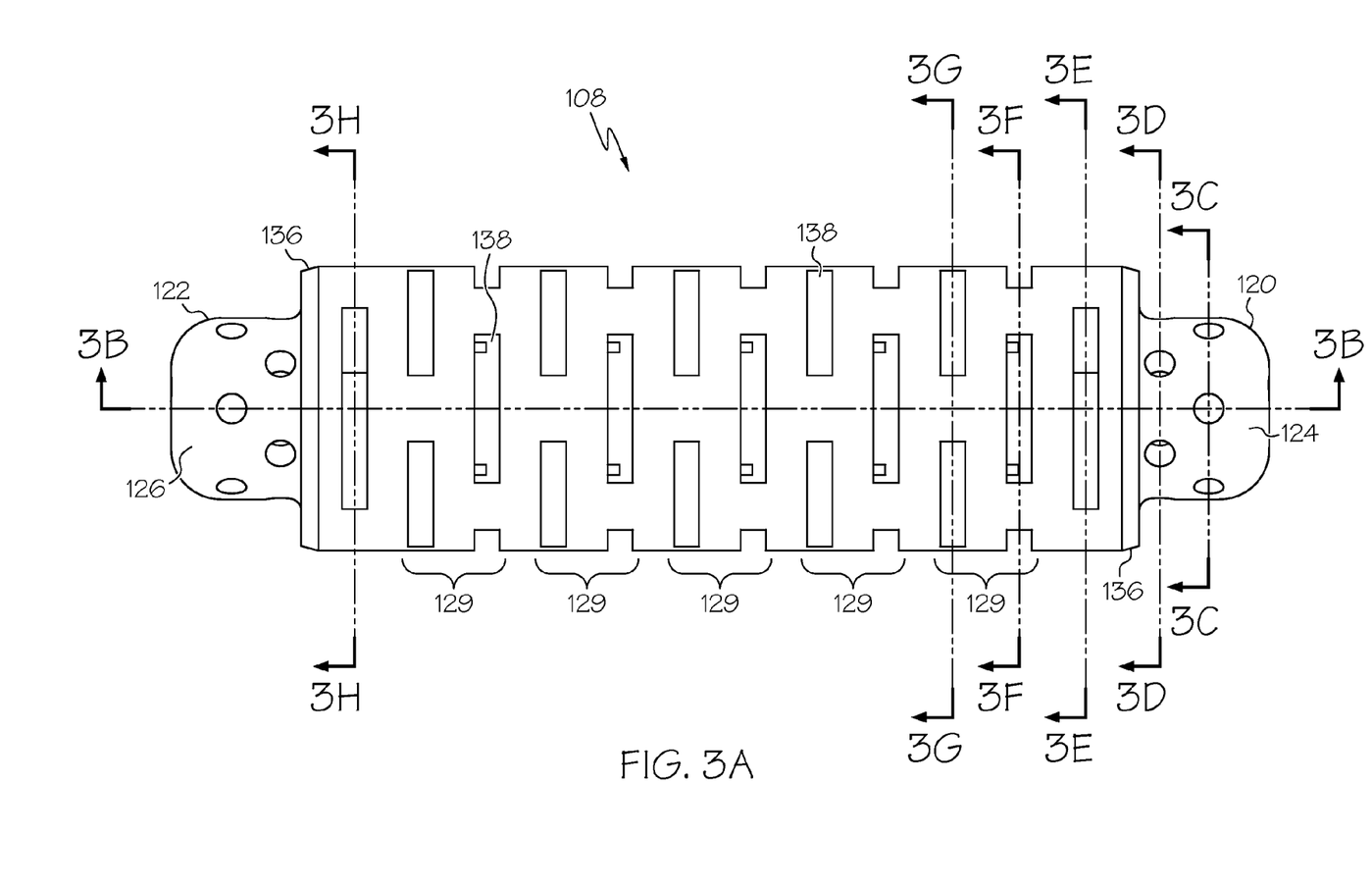
FIG. 3A is an external view of the monolithic flow restrictor of FIG. 3.
Figure 3B:
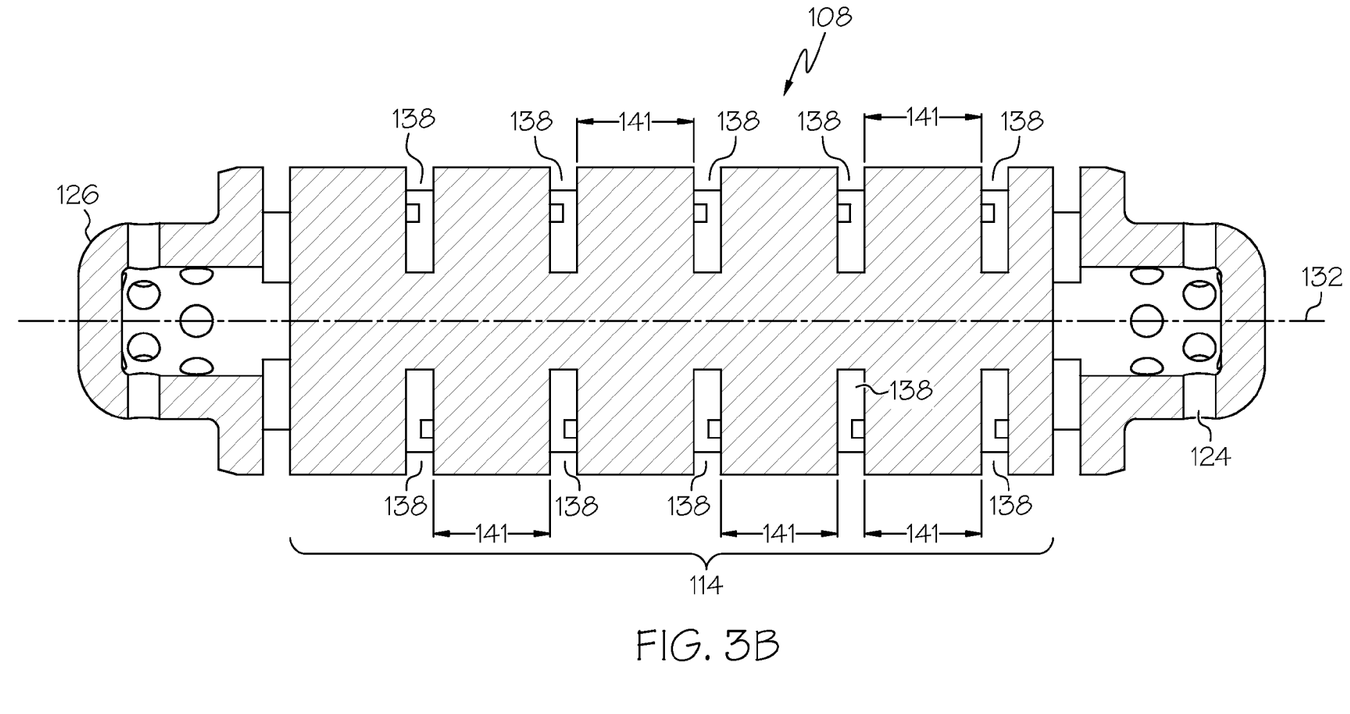
FIG. 3B is a longitudinal cross-sectional view of the monolithic flow restrictor of FIGS. 3 and 3A.
Figure 3C:
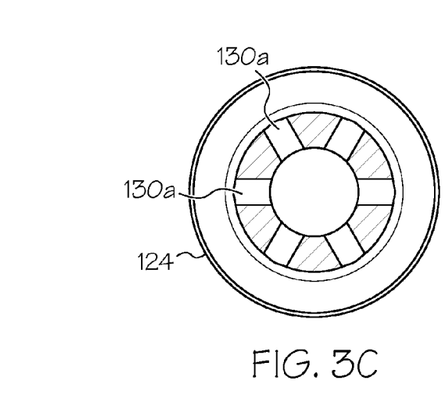
FIGS. 3C and 3D are horizontal cross-sectional views of a first screen of the monolithic flow restrictor of FIGS. 3 and 3A as viewed looking toward a second end of the monolithic flow restrictor.
Figure 3D:
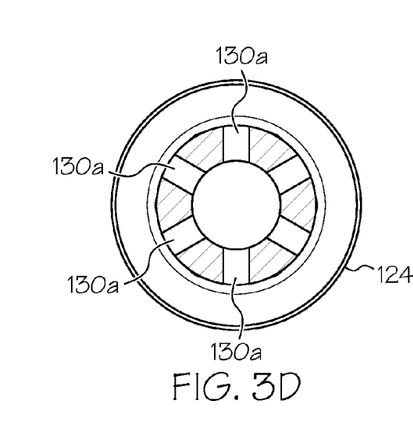
Figure 3E:
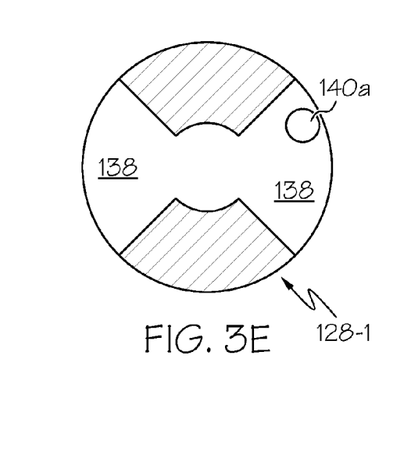
FIGS. 3E through 3H each depict a cross-sectional portion of a series of cross-sectional portions in an exemplary flow restrictor body of the monolithic flow restrictor of FIGS. 3, 3A, and 3B as viewed looking toward the second end of the monolithic flow restrictor.
Figure 3F:
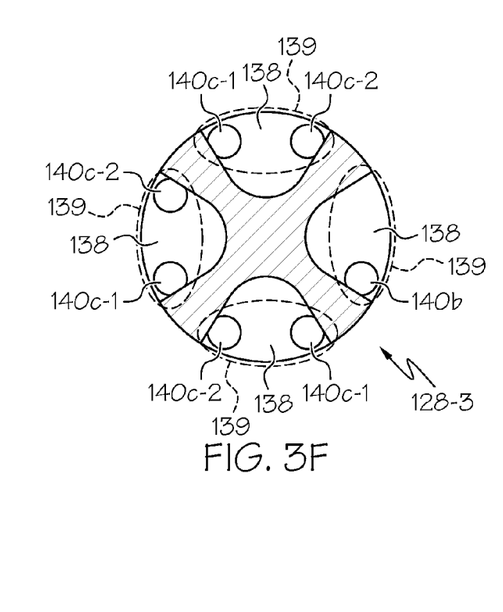
Figure 3G:
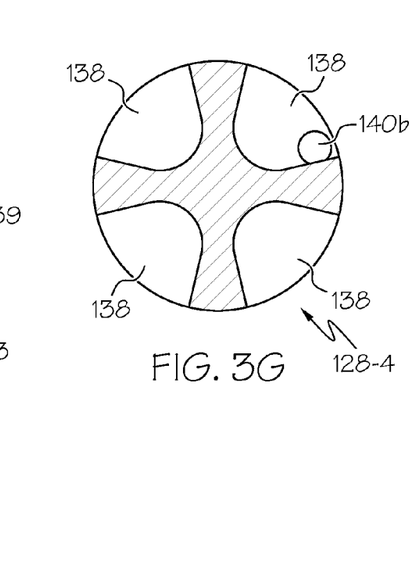
Figure 3H:
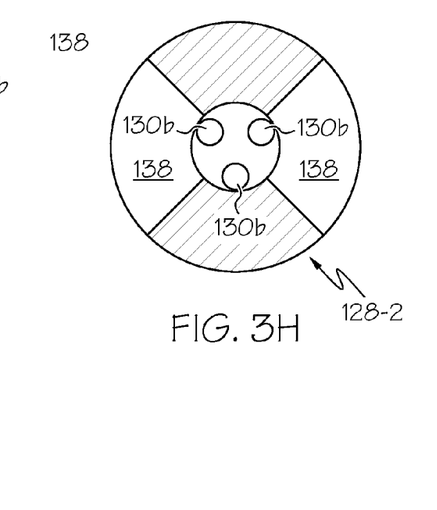
Figure 7:
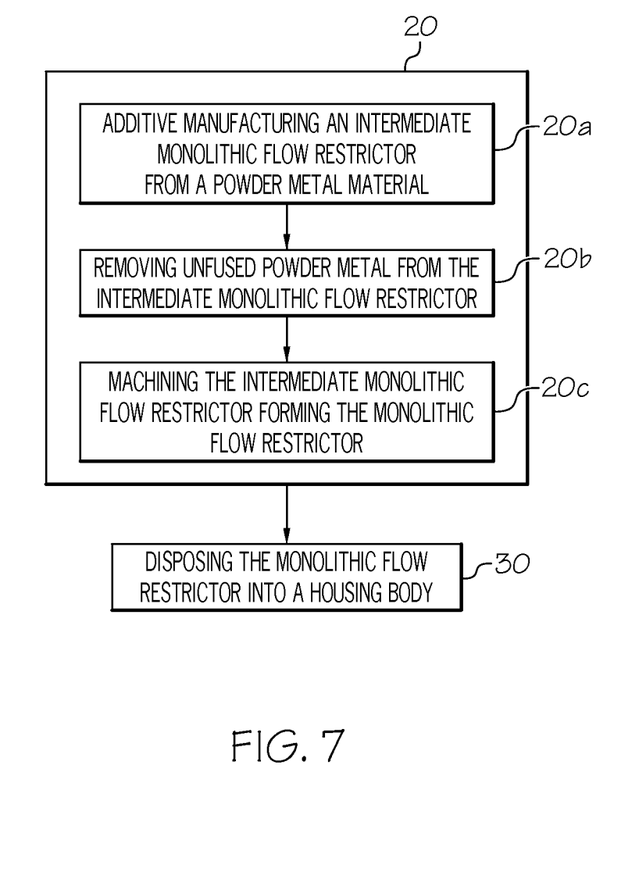
FIG. 7 is a flow chart of a method for manufacturing a flow restrictor assembly including a monolithic flow restrictor according to exemplary embodiments of the present invention.

Referring now to FIG. 7, according to exemplary embodiments of the present invention, a method 10 for manufacturing the flow restrictor assembly 100 begins by forming the monolithic flow restrictor 108 such as depicted in FIGS. 3, 3A, and 3B (step 20) by an additive manufacturing technique. The step 20 of forming the monolithic flow restrictor 108 comprises sub-step 20a of using additive manufacturing to form an intermediate monolithic flow restrictor from a powder metal material, sub-step 20b of removing unfused powder metal from the intermediate monolithic flow restrictor, and sub-step 20c of machining the intermediate monolithic flow restrictor forming the monolithic flow restrictor.

Sub-step 20a begins by using additive manufacturing fabrication techniques to form the intermediate monolithic flow restrictor 108. As known by those skilled in the art, additive manufacturing (AM) fabrication techniques may begin with providing a model, such as a design model, of the component. The model may be defined in any suitable manner. For example, the model may be designed with computer aided design (CAD) software and may include three-dimensional ("3D") numeric coordinates of the entire configuration including both external and internal surfaces. In one exemplary embodiment, the model may include a number of successive two-dimensional cross-sectional slices that together form the 3D monolithic flow restrictor.

The monolithic flow restrictor is formed according to the model, using the additive layer manufacturing process. Some examples of additive layer manufacturing processes are well known to those skilled in the art and include: micro-pen deposition in which liquid media is dispensed with precision at the pen tip and then cured; selective laser sintering in which a laser is used to sinter a powder media in precisely controlled locations; laser wire deposition in which a wire feedstock is melted by a laser and then deposited and solidified in precise locations to build the product; electron beam melting; laser engineered net shaping; direct metal deposition, Direct Metal Electron Beam Fusion (DMEBF), and other powder consolidation techniques. In one particular exemplary embodiment, direct metal laser fusion (DMLF) may be used to manufacture the component. DMLF is a commercially available laser-based rapid prototyping and tooling process by which complex parts may be directly produced by precision melting (hereinafter "AM fusion melting") and solidification of metal powder (the "build material") into successive layers of larger structures, each layer corresponding to a cross-sectional layer of the 3D component. DMLF may include direct metal laser sintering (DMLS).

Figure 8:
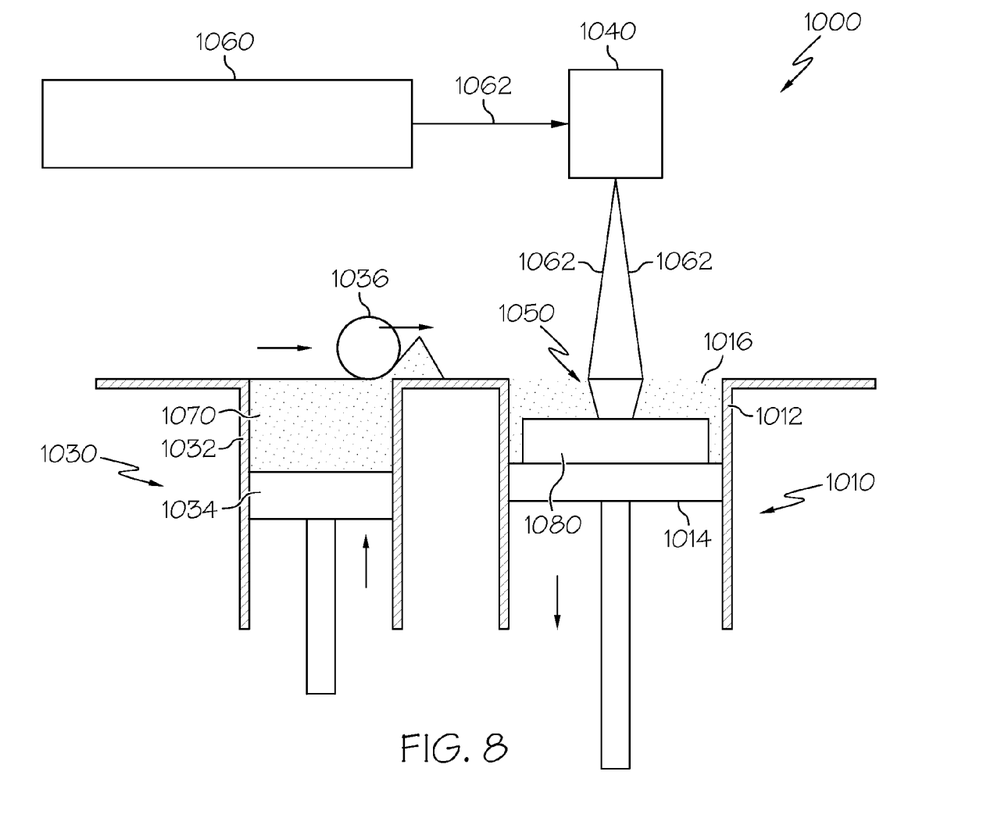
FIG. 8 is a schematic view of an exemplary direct metal laser fusion (DMLF) system for fabricating the monolithic flow restrictor of FIGS. 3, 3A, and 3B.

FIG. 8 is a schematic view of an exemplary DMLF system 1000 for fabricating a monolithic flow restrictor from a powder metal alloy, in accordance with an exemplary embodiment. The system 1000 includes a fabrication device 1010, a powder delivery device 1030, a scanner 1040, and a laser 1060 that function to fabricate the intermediate monolithic flow restrictor 1050 with build material 1070. The fabrication device 1010 includes a build container 1012 with a fabrication support 1014 on which the intermediate monolithic flow restrictor 1050 is formed and supported. The fabrication support 1014 is movable within the build container 1012 in a vertical direction and is adjusted in such a way to define a working plane 1016. The delivery device 1030 includes a powder chamber 1032 with a delivery support 1034 that supports the build material 1070 and is also movable in the vertical direction. The delivery device 1030 further includes a roller or wiper 1036 that transfers build material 1070 from the delivery device 1030 to the fabrication device 1010.

During operation, a base block 1080 may be installed on the fabrication support 1014. The fabrication support 1014 is lowered and the delivery support 1034 is raised. The roller or wiper 1036 scrapes or otherwise pushes a portion of the build material 1070 from the delivery device 1030 to form the working plane 1016 in the fabrication device 1010. The laser 1060 emits a laser beam 1062, which is directed by the scanner 1040 onto the build material 1070 in the working plane 1016 to selectively fuse the build material 1070 into a cross-sectional layer of the intermediate monolithic flow restrictor 1050 according to the design. More specifically, the speed, position, and other operating parameters of the laser beam 1062 are controlled to selectively fuse the powder of the build material 1070 into larger structures by rapidly melting the powder particles that may melt or diffuse into the solid structure below, and subsequently, cool and re-solidify. As such, based on the control of the laser beam 1062, each layer of build material 1070 may include unfused and fused build material 1070 that respectively corresponds to the first and second screens and the series of cross-sectional portions that form the monolithic flow restrictor 108. In general, the laser beam 1062 is relatively low power to selectively fuse the individual layer of build material 1070. As an example, the laser beam 1062 may have a power of approximately 50 to 500 Watts, although any suitable power may be provided.

Upon completion of each layer, the fabrication support 1014 is lowered and the delivery support 1034 is raised. Typically, the fabrication support 1014, and thus the intermediate monolithic flow restrictor 1050 does not move in a horizontal plane during this step. The roller or wiper 1036 again pushes a portion of the build material 1070 from the delivery device 1030 to form an additional layer of build material 1070 on the working plane 1016 of the fabrication device 1010. The laser beam 1062 is movably supported relative to the intermediate monolithic flow restrictor 1050 and is again controlled to selectively form another cross-sectional layer. As such, the intermediate monolithic flow restrictor 1050 is positioned in a bed of build material 1070 as the successive layers are formed such that the unfused and fused material supports subsequent layers. This process is continued according to the modeled design as successive cross-sectional layers are formed into the intermediate monolithic flow restrictor having the shape of the final monolithic flow restrictor.

The delivery of build material 1070 and movement of the intermediate monolithic flow restrictor 1050 in the vertical direction are relatively constant and only the movement of the laser beam 1062 is selectively controlled to provide a simpler and more precise implementation. The localized fusing of the build material 1070 enables more precise placement of fused material to reduce or eliminate the occurrence of over-deposition of material and excessive energy or heat, which may otherwise result in cracking or distortion.

Any suitable laser and laser parameters may be used, including considerations with respect to power, laser beam spot size, and scanning velocity. According to exemplary embodiments, all these operations are performed in an environment substantially free of atmospheric oxygen created using inert gas, preferably argon or nitrogen. According to an exemplary embodiment of the present invention, the particle size of the powder metal build material comprises from about 5 micron to about 30 micron. The particle size of the powder metal build material used to manufacture the monolithic flow restrictor is smaller than conventionally used in additive manufacturing processes in order to achieve the precision features of the monolithic flow restrictor according to exemplary embodiments of the present invention.

Referring again to FIG. 7, according to exemplary embodiments of the present invention, the step 20 of forming the monolithic flow restrictor 108 comprises the sub-step 20b of removing the unfused (i.e., unmelted) PM particles from the intermediate monolithic flow restrictor as noted previously. The unfused PM particles may be removed by rinsing the intermediate article with water, solvent, a vapor blast (i.e., high pressure air), or the like. The plurality of slots 138 permits the intermediate monolithic flow restrictor to be thoroughly rinsed to remove the unfused PM particles.

Still referring to FIG. 7, according to exemplary embodiments of the present invention, the step 20 of forming the monolithic flow restrictor 108 comprises the sub-step 20c of machining the intermediate monolithic flow restrictor to thereby form the monolithic flow restrictor. The sub-step 20c of machining the intermediate monolithic flow restrictor comprises machining at least a portion of the outer diameter of the intermediate monolithic flow restrictor. The outer diameter is machined to a high tolerance to enable press fitting the monolithic flow restrictor into the first bore of the housing body as hereinafter described. In accordance with another exemplary embodiment of the present invention, at least a portion of the outer diameter of the intermediate monolithic flow restrictor 108 may be selectively machined to allow the fluid to bypass a plurality of the restricting orifices, thereby reducing the flow restriction through the monolithic flow restrictor. In the most restrictive state, the outer diameter of the monolithic flow restrictor would have a clean round diameter so fluid going through the first end would have to go through every restricting orifice before exiting. The number of restricting orifices and slots may be adjusted during machining depending upon the desired restriction value of the monolithic flow restrictor. As a result, it is not necessary to keep different sizes of monolithic flow restrictors on hand.

When the monolithic flow restrictor is completed, it is removed from the additive manufacturing system (e.g., from the DMLF system 1000). The monolithic flow restrictor may undergo finishing treatments. Finishing treatments may include, for example, aging, annealing, quenching, peening, polishing, etching, hot isostatic pressing (HIP), or coatings. It is to be understood that no finishing treatments may be necessary.

Still referring to FIG. 7, according to exemplary embodiments of the present invention, the method 10 for manufacturing the flow restrictor assembly continues by disposing the monolithic flow restrictor in the housing body (step 30). The monolithic flow restrictor may be disposed in the housing body by inserting the monolithic flow restrictor 108 into the housing body (more specifically, into the first bore of the housing body as depicted in FIG. 1A). The monolithic flow restrictor is locked in the housing body by the interference fit between the monolithic flow restrictor and the housing body. The manufactured flow restrictor assembly 100 is then flow tested for accurate, consistent performance.

Figure 2A:
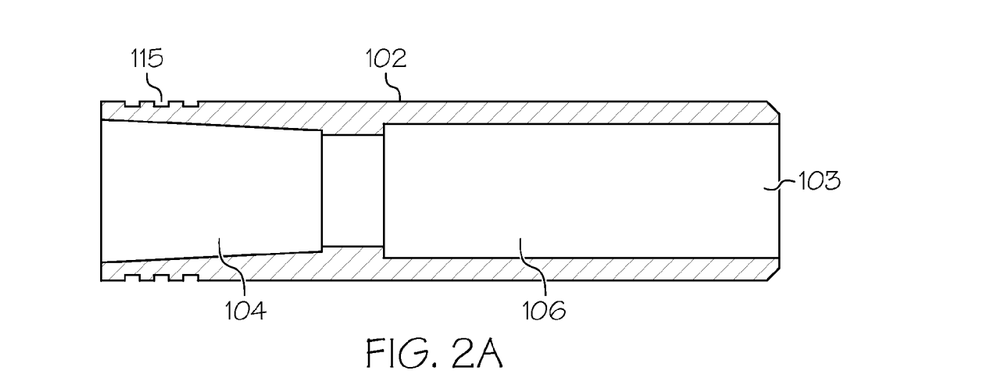
FIG. 2A is a cross-sectional view of the housing body taken along the line 2A-2A of FIG. 2.

As noted previously, the flow restrictor assembly is configured for disposing in the flow channel 112 of the hydraulic assembly 113 (FIG. 1A). The flow restrictor assembly is disposed in the flow channel and the expansion pin 110 is inserted and driven into the second bore 104 of the housing body. If the second bore 104 of the housing body is tapered (as depicted in FIGS. 1A and 2A), a tapered expansion pin 110 may be inserted into the matching tapered second bore narrow end first. Using friction and penetration, the locking grooves 115 on an outer diameter of the housing body bite into a wall of the flow channel 112 to effect a seal and retain the flow restrictor assembly inside the flow channel of the hydraulic assembly. Thus, the expansion pin substantially assures retention of the flow restrictor assembly in the flow channel, without the use of threads or sealants. The installation of the expansion pin may be performed manually or automatically.

In use, fluid may enter the monolithic flow restrictor from either the first end or the second end. In one direction, as depicted in FIG. 4 and described above, the fluid from the fluid channel 112 enters orifices 130a and 130b of the first screen 124 and flows into the first screen interior. The fluid flows through the central orifice 137 in the platform 136 into the initial restricting orifice 140a into one of the slots 138 in the spin cross-sectional portion of the first set where it impinges on the top surface 143 of the land 141 of the immediately succeeding cross sectional portion. The fluid then flows through the single restricting orifice 140b extending through the land 141 of the slot extending from the spin cross-sectional portion to the corresponding slot in the immediately successive impingement cross-sectional portion. The fluid then flows from the slot in the impingement cross-sectional portion up through restricting orifice 140c-1 of the orifice pair 139 to the immediately preceding spin cross-sectional area before flowing down through restricting orifice 140c-2 of the orifice pair 139 to the immediately successive impingement cross-sectional portion. This up and down flow between the spin cross-sectional portion and the impingement cross-sectional portion of each set continues until the fluid has flowed through each restricting orifice 140c-1 and 140c-2 of each orifice pair 139 in a single set before flowing through the single restricting orifice 140b in the impingement cross-sectional portion of the set to then be repeated in the next set of alternating spin and impingement cross-sectional portions. After being tortuously conducted through all sets of the alternating spin and impingement cross-sectional portions, the fluid flows through the single restricting orifice 140b extending through the land 141 between the slot 138 in the last impingement cross-sectional portion of the flow restrictor body 114 and the corresponding slot in the second cross-sectional portion before passing into the interior of the second screen and out through orifices 130a and 130b thereof before flowing through the open center of the expansion pin and exiting out a second end of the expansion pin. When fluid flow starts at the first end of the monolithic flow restrictor, the flow is clockwise through the monolithic flow restrictor when viewed from the first end thereof.

While fluid flow in one direction through the monolithic flow restrictor is depicted in FIG. 4, it is to be understood that fluid may flow in the opposite direction from that previously described in which case the flow is clockwise through the monolithic flow restrictor when viewed from the second end of the expansion pin. More particularly, in the other direction, the fluid from the flow channel 112 may enter the pin second end of the expansion pin 110, flow toward the monolithic flow restrictor through a center bore of the expansion pin 110 and into the orifices 130a and 130b of the second screen before tortuously flowing through the slots and series of restricting orifices of the flow restrictor body and then exiting the orifices 130a and 130b of the first screen.

Fluid flow through the monolithic flow restrictor 108 through the slots 138 and series of restricting orifices 140a, 140b, and 140c-1 and 140c-2 provides the tortuous fluid flow path. If the number of restricting orifices and/or slots has been reduced as a result of the machining step, the tortuous fluid flow path is shortened, thereby providing less flow restriction as noted previously. In this case, the fluid flow may not flow in every original set, but rather a set or a cross-sectional portion may have a machining cut that allows the flow to bypass a plurality of restricting orifices. As a result, flow restriction through the monolithic flow restrictor is consistent and reliable, the monolithic flow restrictor is substantially tolerant of particulate and, is significantly less expensive to manufacture than conventional multi-stage flow restrictors.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A monolithic flow restrictor configured for disposing in a fluid passage of a housing body, the monolithic flow restrictor comprising:
   a first end and a second end;
   a first screen at the first end and a second screen at the second end; and
   a series of cross-sectional portions between the first screen and the second screen, each cross-sectional portion having a plurality of slots formed in a radially outer surface thereof for connecting a series of restricting orifices formed in the monolithic flow restrictor for tortuously conducting a fluid through the series of cross-sectional portions,
   wherein each of the first and second screens includes n orifices distributed in parallel along a line extending perpendicularly from a central axis of the flow restrictor body and in a top of the first screen and a top of the second screen.

2. The monolithic flow restrictor of claim 1, wherein the series of cross-sectional portions comprise:
   a first cross-sectional portion adjacent the first screen;
   a second cross-sectional portion adjacent the second screen; and
   a central cross-sectional portion between the first and second cross-sectional portions, the central cross-sectional portion comprising a stack of at least one set of alternating spin and impingement cross-sectional portions.

3. The monolithic flow restrictor of claim 2, wherein each restricting orifice in the series of restricting orifices extends through a land between a slot in a cross-sectional portion and a corresponding slot of the plurality of slots in an immediately successive cross-sectional portion.

4. The monolithic flow restrictor of claim 2, wherein the plurality of slots in the spin cross-sectional portion of the at least one set are staggered in relation to the plurality of slots in an immediately preceding and an immediately succeeding impingement cross-sectional portions.

5. The monolithic flow restrictor of claim 3, wherein the series of restricting orifices comprises a plurality of single restricting orifices and a plurality of orifice pairs, an initial restricting orifice extending through a land between a top thereof and a corresponding slot in the immediately successive cross-sectional portion and each subsequent restricting orifice extending through a land between a slot of a cross-sectional portion and a corresponding slot of an immediately successive cross-sectional portion.

6. The monolithic flow restrictor of claim 5, wherein each single restricting orifice is staggered in relation to the single restricting orifice in the immediately successive cross-sectional portion so that the fluid being conducted through the monolithic flow restrictor will be caused to impinge on a top surface of the land of the immediately succeeding cross-sectional portion while being tortuously conducted through the staggered single restricting orifices.

7. The monolithic flow restrictor of claim 5, wherein each orifice pair of the plurality of orifice pairs comprises a pair of restricting orifices that extend through the land between one of the slots in the spin cross-sectional portion and the corresponding slot in the immediately successive impingement cross-sectional portion of one set in the stack.

8. A method for manufacturing a flow restrictor assembly comprising the steps of:
   forming a monolithic flow restrictor comprising a first end and a second end, a first screen at the first end and a second screen at the second end, and a series of cross-sectional portions between the first screen and the second screen forming a flow restrictor body, each of the cross-sectional portions having a plurality of slots formed in a radially outer surface thereof for connecting a series of restricting orifices formed in the monolithic flow restrictor for tortuously conducting a fluid through the series of cross-sectional portions, and each of the first and second screens includes n orifices distributed in parallel along a line extending perpendicularly from a central axis of the flow restrictor body and in a top of the first screen and a top of the second screen, the forming step comprising the steps of:
      using additive manufacturing to form an intermediate monolithic flow restrictor from a powder metal material;
      removing unfused powder metal from the intermediate monolithic flow restrictor;
      machining the intermediate monolithic flow restrictor after the removing step; and
      disposing the monolithic flow restrictor in a housing body.

9. The method of claim 8, wherein the step of using additive manufacturing comprises direct metal laser sintering of powder metal particles having a particle size of about 5 to about 30 micron.

10. The method of claim 8, wherein the step of machining comprises at least one of machining at least a portion of an outer surface of the intermediate monolithic flow restrictor to a close tolerance fit with an inner surface of the housing body to substantially seal the plurality of slots in the monolithic flow restrictor.

11. The method of claim 10, wherein the step of machining further comprises machining away at least one portion of the outer surface to allow the fluid to bypass a plurality of the restrictive orifices, thereby reducing flow restriction through the monolithic flow restrictor.

\* \* \* \* \*